P. MARQUA.
PULLEY.
APPLICATION FILED DEC. 11, 1914.
1,157,710.
Patented Oct. 26, 1915.
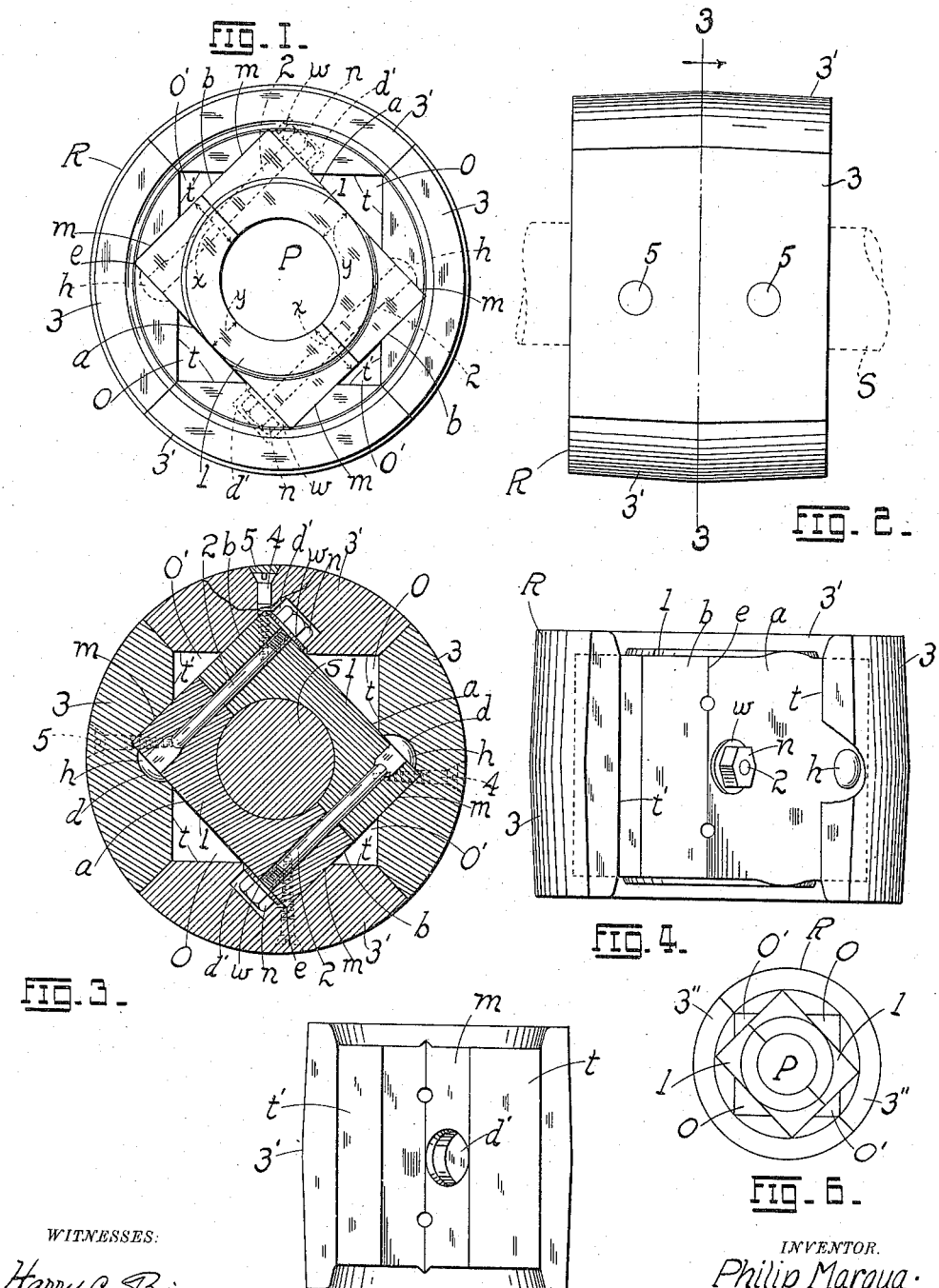

UNITED STATES PATENT OFFICE.

PHILIP MARQUA, OF ST. LOUIS, MISSOURI.

PULLEY.

1,157,710.  Specification of Letters Patent.  Patented Oct. 26, 1915.

Application filed December 11, 1914. Serial No. 876,683.

*To all whom it may concern:*

Be it known that I, PHILIP MARQUA, citizen of the United States, residing at St. Louis, State of Missouri, have invented certain new and useful Improvements in Pulleys, of which the following is a full, clear, and exact description, reference being had to the accompanying drawings, forming a part hereof.

My invention has relation to improvements in pulleys; and it consists in the novel features of construction more fully set forth in the specification and pointed out in the claims.

In the drawings, Figure 1 is an end elevation of a pulley made according to my invention; Fig. 2 is a peripheral elevation thereof; Fig. 3 is a middle vertical transverse section thereof on the line 3—3 of Fig. 2; Fig. 4 is a view similar to Fig. 2 with one of the rim sections removed however to expose the hub within, parts being broken; Fig. 5 is an inside plan view of one of the rim sections; and Fig. 6 is an end elevation of a modified form of pulley, the view being a mere outline one.

The present invention is specially directed to wood pulleys, and to split wood pulleys in particular, and has for its object to construct a wood pulley with a minimum waste of material; one whose construction entails a minimum amount of labor; one which is "fool-proof" so that any ordinary workman can apply it to the shaft on which it is to be mounted; one which is perfectly balanced; one which does not shrink in a way to produce distortion or warping, so that the pulley always retains its proper shape; one in which the rim is removable from the hub portion, thereby allowing free and ready access to the bolts by which the sections of the hub (which embrace the shaft) are held together and gripped to the shaft; one permitting the use of woods of proper variety for the hub and rim sections respectively whereby a maximum grip may be had on the shaft; one which is readily applied, or removed from the shaft, and one possessing further and other advantages better apparent from a detailed description of the invention, which is as follows.

Referring to the drawings, and for the present to Figs. 1 to 5 inclusive, 1, 1, represent two sections or halves forming the hub of the pulley when assembled, the hub being rectangular and preferably oblong in cross-section, each half or member 1 being formed with a semi-cylindrical bore or groove so that when the two halves are assembled they form a cylindrical opening P for the shaft S to which the pulley is attached. By virtue of the oblong cross-section of the hub there result the contiguous faces $a$, $b$, the opposite faces $a$ being the larger and the faces $b$ the smaller, the respective faces being disposed at right angles to one another and meeting along edges $e$ disposed parallel to the axis of the hub and the axis of the shaft coincident therewith. As shown in the drawings, the hub sections are separable along a central plane passing through the axis of the hub and parallel to the larger faces $a$, $a$. The hub being oblong in cross-section (and not square), it follows that the thickness of the material between the faces $b$, $b$, and the bounding walls of the opening P, measured along the lines $x$ is greater than the thickness between the faces $a$, $a$, measured along the lines $y$, $y$, thus leaving an excess of material at the ends of the oblong cross section of the hub. This excess while not indispensable is desirable to provide ample material for the securing screws by which the detachable rim sections are fastened to the hub. When the sub sections are assembled they are secured to one another by the carriage bolts 2, 2, driven through the hub sections on opposite sides of the axis of the hub and across the plane of separation of the sections, the bolts being inserted from opposite directions so that the heads $h$, $h$, thereof are diagonally opposite to one another, and the washers $w$ and clamping nuts $n$ are likewise diagonally opposite to one another. The ends of the bolts carrying the nuts $n$ and washers $w$ being the weighted ends, it follows that the hub (and hence the pulley) will be perfectly balanced. The bolts 2, 2, are preferably disposed in a central transverse plane intersecting the axis of the hub, that is to say, the axes of the bolts are in a common transverse plane equidistant from the ends of the hub.

In the present embodiment of my invention, I form the rim R of four detachable sections 3, 3, 3′, 3′, the opposite sections 3, 3, being provided with depressions or pockets $d$ to receive the heads $h$ of the bolts, and the opposite sections 3′, 3′, being provided with larger depressions or pockets $d'$, $d'$, to receive the nuts n. Passed through each section 3, 3', on opposite sides of the plane of disposition of the bolts 2, 2, are securing screws 4, 4, the same being directed into the hub-sections through the edges or ridges e in a direction to substantially bisect the angle between the faces a, b. The screws 4 are driven into the rim sections below the peripheral surfaces thereof, the sockets thus remaining being filled by wooden plugs 5 flush with the surface of the rim as shown. The hub is preferably composed of hard wood such as maple or its equivalent, and the rim of pine or other softer wood so as to exert a proper grip on the drive-belt. I do not of course wish to be restricted to any kind of wood, or to any kind of material entering into the construction of the pulley. As fully shown in the drawings, the inner faces of the rim sections are preferably (though not necessarily) plane, and leading from said faces are grooves m the walls of which are disposed at right angles to one another so as to engage the faces a, b, of the hub. The said inner faces of the rim sections collectively form a rectangular prism, the planes of whose faces intersect the faces a, b, leaving triangular prismatic openings O, O', the openings O being the larger and positioned diagonally opposite one another, the diagonal openings O' being opposite the plane of separation between the hub sections. Of course were the inner faces of the rim sections other than plane, the shape of the passages or openings O, O', would be correspondingly changed. The opposite walls of the grooves m are substantially the same in width so that they engage the faces a, b, of the hub throughout equal areal portions from the ridges e to the inner edges of said walls. Owing to the fact that the inner faces of the rim sections form the faces of a prism which is square in cross-section and the faces a, b, of the hub form a prism which is oblong in cross-section, the portions t (Fig. 3) of the inner faces of the rim sections out of engagement with the faces a of the hub, will be wider than the portions t' which are out of engagement with the hub faces b. The unequal width of the portions t, t', gives rise to the unequal sizes of the passages or openings O, O'. By this arrangement however, another object is subserved, which is, that the pulley is "fool-proof"; that is to say, an unskilled mechanic can apply the members 3, 3', without danger of placing them on wrong, the unequal face sections t, t', making these members non-reversible so that they can be fitted only one way. It may be stated in passing that the ends of the bolts 2, 2, adjacent the heads h, h, thereof have a tight or drive fit through the particular hub section which carries the bolt, the opposite end of the bolt or that carrying the screw-threads being loosely received by the opposite section of the hub.

In applying the pulley to a shaft S, the bolts 2, 2 are first driven into their respective hub sections as described, and the rim sections 3, 3, are secured in position to said hub sections. The hub sections are then applied to the shaft from diametrically opposite directions and brought together so as to embrace the shaft, the threaded ends of the bolts passing freely through the opposing sections of the hub. Thereupon the engineer or workman applies the washers w and nuts n to the projecting ends of the bolts, and by driving home the nuts, draws the hub sections together and causes the same to tightly grip the peripheral walls of the shaft. To insure this result the opening P through which the shaft passes must be slightly smaller than the circumference of the shaft so as to insure a firm grip. By now turning the shaft (with the hub and its two rim sections clamped thereto) for the convenience of the operator so as to bring in front of him successively the two remaining gaps of the rim to be completed, he merely deposits the remaining sections 3', 3', into their proper places, drives home the screws 4 and the pulley is completed, with the exception of inserting the plugs 5 which is readily done. To remove a pulley, the rim sections 3', 3', are first detached, thereby according access to the nuts n of the bolts 2, and by unscrewing the nuts, the hub sections may be readily parted, the bolts which have a drive fit in one section fitting loosely in the opposing section as described, so that the detaching of a pulley from, or the mounting of the same upon, a shaft is accomplished in a minimum loss of time.

I do not of course wish to be restricted to the number of sections of either the hub or rim, as these may be varied without a departure from either the nature or spirit of my invention; and in Fig. 6 I show an outline of a pulley having only two rim sections 3'', 3'', the remaining portions of the pulley being substantially as those already described. In fact, the pulley may be changed in many minor details without affecting the invention or principle thereof as here described.

By reference to Fig. 1 it will be seen that the grain of the wood on the hub runs toward the ends of the longer faces of the oblong cross-section of the hub, the grain of the wood of the rim sections running transverse to the general direction of the grain of the hub. This tends to prevent splitting, and results in the formation of a strong and durable pulley.

Having described my invention, what I claim is:

1. A wood pulley comprising a central hub composed of two sections adapted to jointly embrace a suitable supporting shaft, and an outer rim composed of two or more sections each in interlocked relation with two contiguous outer faces of a section of the hub, whereby the hub and rim are rotatable as a unit about a common axis.

2. A pulley comprising a hollow hub composed of two sections secured together, the outer bounding walls of the hub forming a polygon in cross-section, and a rim comprising a series of detachable sections each embracing the hub about the contiguous faces forming an angle of the polygon, whereby the rim sections are locked to the hub sections and rotate as a unit therewith.

3. A pulley comprising a sectional hub polygonal in cross-section, and a sectional rim detachably secured to the hub, the inner walls of each section of the rim bearing against the outer faces of the hub at points contiguous to the vertices of the angles formed by said faces.

4. A wood pulley comprising a sectional hub having a central tubular bore and faces surrounding the tubular portion and meeting to impart an outer polygonal cross-section to the hub, an outer sectional rim encompassing the hub, each section of the rim being recessed to receive the corner formed by two meeting faces on the polygonal portion of the hub, whereby the hub and rim sections are interlocked and operate to rotate as a unit.

5. A pulley comprising a central hub substantially rectangular and oblong in cross-section, the grain of the wood running toward the ends of the longer face of the hub, and an outer wooden rim composed of sections recessed to receive the several corners of the hub, with the grain of the sections running transverse to the general direction of the grain of the hub as aforesaid.

6. A pulley comprising a central hub substantially rectangular in cross-section, and a detachable rim composed of sections each engaging the hub along portions of contiguous faces from the meeting edges of said faces to points suitably removed from said edges.

7. A pulley comprising a central hub polygonal in cross-section, and a detachable sectional rim encompassing the same, each section engaging portions of contiguous faces of the hub from the meeting edges of said faces to points suitably removed from said edges.

8. A wood pulley comprising an inner hub oblong in cross-section and composed of two sections separable along a central plane between the longer sides of the oblong, a series of detachable rim sections encompassing the hub and collectively forming a continuous rim for the pulley, the inner faces of the rim sections being grooved to receive the corners of the hub, the walls of the grooves engaging the hub faces forming the corners, from the meeting edges of the faces to suitable distances from said edges, securing devices passed through the rim sections and through the corners of the hub, and securing devices passed through the hub sections transversely to the plane of separation between the sections and disposed on opposite sides of the axis of the hub.

In testimony whereof I affix my signature in presence of two witnesses.

PHILIP MARQUA.

Witnesses:
 EMIL STAREK,
 JOS. A. MICHEL.